2 Sheets—Sheet 1.
M. MARTISCHANG.
Corn-Planter.
No. 209,973.              Patented Nov. 19, 1878.
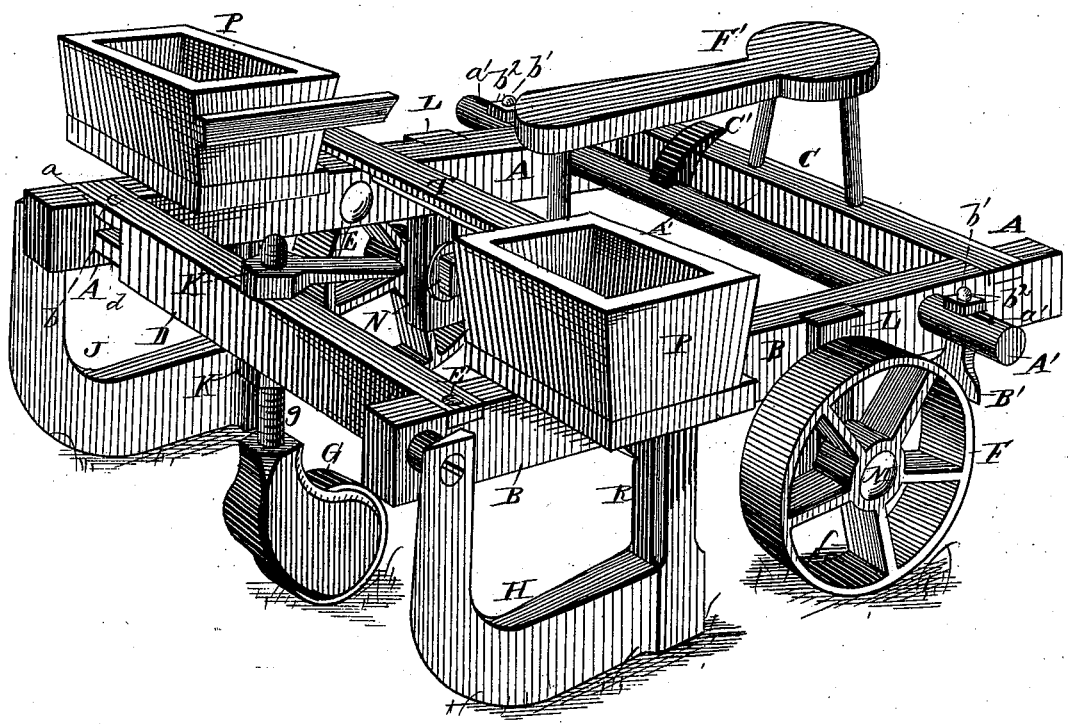
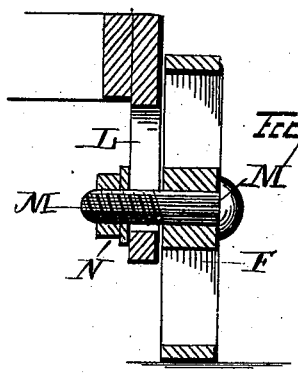
WITNESSES
E. J. Nottingham
A. W. Bright
INVENTOR
M. Martischang
By H. A. Seymour.
ATTORNEY 2 Sheets—Sheet 2.

M. MARTISCHANG.
Corn-Planter.

No. 209,973. Patented Nov. 19, 1878.

WITNESSES
E. J. Nottingham
A. W. Bright

INVENTOR
M. Martischang
By H. A. Seymour
ATTORNEY

N. PETERS, PHOTO-LITHOGRAPHER, WASHINGTON, D. C.

UNITED STATES PATENT OFFICE.

MICHEL MARTISCHANG, OF DENMARK TOWNSHIP, LEE COUNTY, IOWA.

IMPROVEMENT IN CORN-PLANTERS.

Specification forming part of Letters Patent No. 209,973, dated November 19, 1878; application filed February 25, 1878.

*To all whom it may concern:*

Be it known that I, MICHEL MARTISCHANG, of Denmark township, in the county of Lee and State of Iowa, have invented certain new and useful Improvements in Corn-Planters, of which the following is a full, clear, and exact description, reference being had to the accompanying drawings, which form part of this specification.

My invention relates to that class of corn-planters which automatically discharge from hoppers as the same are drawn over the ground.

The invention consists in certain parts and combinations of parts, hereinafter described and claimed.

Figure 2:
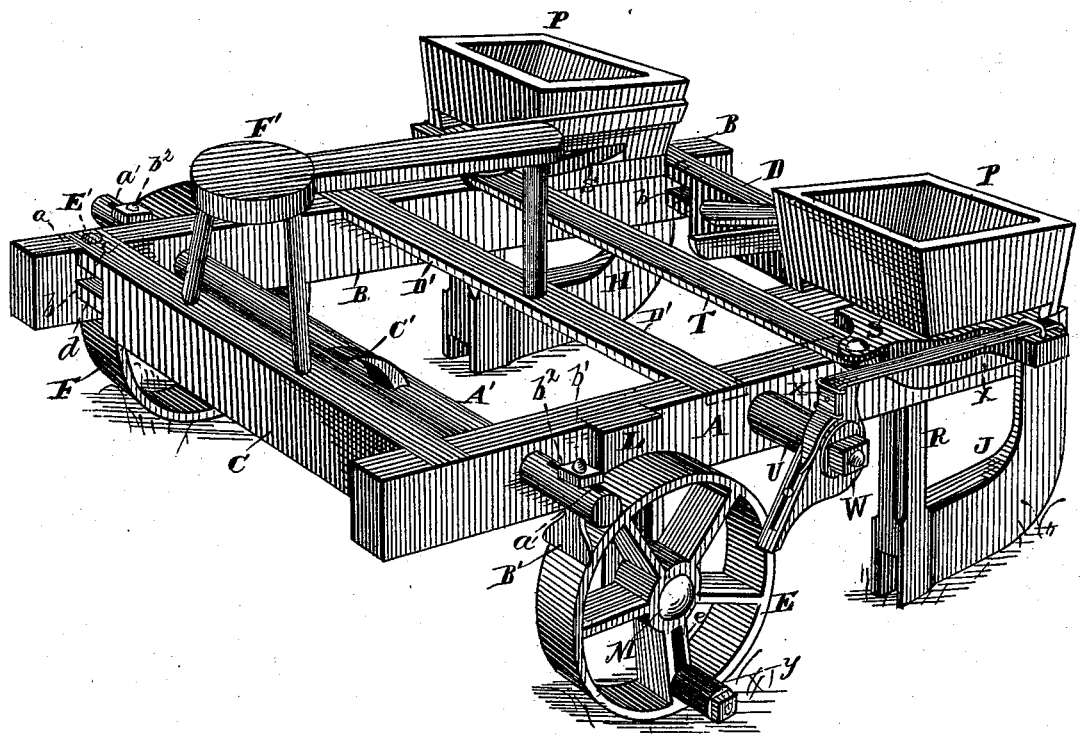
Figure 3:
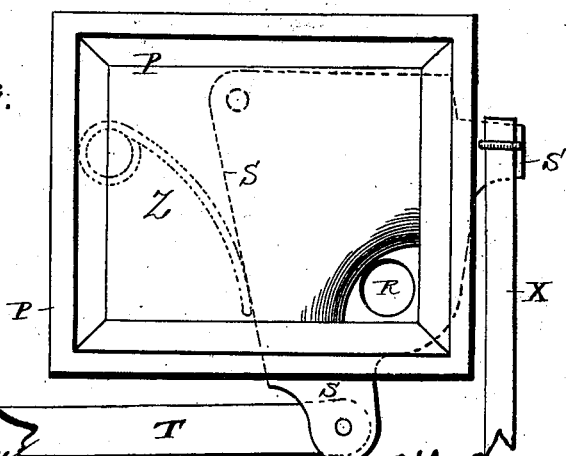

Referring to the drawings, Figure 1 is a view, in front perspective, of my invention. Fig. 2 is a view, in side perspective, of the same. Fig. 3 represents, in detail views, the form of the hoppers and adaptation of the spring-pressed feed-plates thereto. Fig. 4 is a view, in detail, showing the construction of parts by which the axles of the side wheels are vertically adjusted in their journal-hangers.

The frame which supports the grain-hoppers consists, essentially, of the two side rails, A and B, maintained in proper relative location by the cross-bars C and D. This frame is mounted upon the two side wheels, E and F, near the rear of the machine, and upon the central front wheel, G, it (the frame) carrying the runners H and J, which are firmly secured to the side rails, and operate to open the ground for the reception of the corn, in a manner well known.

That the furrows opened for the grain may be as deep or as shallow as desired, I provide means for regulating the height of the frame, and consequently the bottom of the runners, with respect to the ground-line, substantially as follows: The screw-shaft $g$ of the front wheel, G, passes through the front cross-bar, D, and is provided at top and bottom of such cross-bar with nuts K, which may be conveniently adjusted at pleasure. These nuts are provided with handles, as shown in the drawings, and they should be made to bear pretty firmly against the cross-bar when that element of the machine is located at the desired point.

The rear or main wheels are connected with the frame by means of the slotted hangers L, within which the short axles M may be adjusted at any desired point, and thus the rear of the frame regulated in height to correspond with adjustment of front of frame. The inner extremities, M, of the short axles are screw-threaded and provided with nuts N, which clamp them to said hangers when they are adjusted at the desired point within the vertical slots L of the hangers.

The hoppers P, one on each side, are mounted, respectively, over the tubes R, which are so arranged as to conduct the grain down into the furrows made by the runners. Each hopper is provided with a false bottom, beneath which are, respectively, pivoted the plates S, made to vibrate between the openings in the bottom and the mouths of said tubes.

The number of grains to be dropped will depend upon the size of the openings in plates S, which openings form little pockets for the grain; and since the plates are of constant thickness, the size of the pockets may be conveniently adjusted by the introduction of short tubes of varying thickness.

The plates are connected by the coupling-bar T, so that their motions may be made simultaneously, and motion is communicated to them from a driving-wheel, E, by the following interposition of parts: From the side rail, A, projects an arm, U, which carries a tripping device, W. This latter is connected with one of the feed-plates by means of the strap X or other medium, and it is rocked by contact of wiper $y$ with its lower end. Said wiper is adjustably secured to main wheel E, as plainly shown; and it is apparent from the illustration that at each revolution of the wheel the plate must be vibrated, and thus the grain dropped at regular intervals.

The stem of the lateral wiper is screw-threaded on its inner extremity, and provided with a clamping-nut, whereby it may be secured at the desired distance from the hub of the wheel in the radial slot $e$, formed in the latter.

The advantage of this construction is that the degree or extent of movement of the feed-plates may be varied in this manner, so as to make said movement quick and long, or slower and shorter. The plates are returned to their normal positions after displacement, as above explained, by means of a simple leaf or other spring, Z, bearing against the same. The straps or other connections may be detached from the tripping devices if desired, and the plates vibrated by hand.

A' is a rotating shaft, carrying the scrapers B', and these may be brought to bear against the wheels by simply pressing down upon the foot-lever C', located conveniently with respect to the driver's seat.

At D' is a cross-bar, serving to add rigidity to the frame, and affording a foot-rest for the driver, as well as a support for the front end of the driver's seat. It may be much lighter than the cross-bars, and may be dispensed with entirely, if desired. The side wheels are made broad, and are so located as to follow after the runner and close the earth over the grain.

To vary the distance of the furrows from each other within reasonable limits, the connecting-bolts E' may be removed from all the cross-bars and be reinserted in other holes provided for them, as indicated in the drawings. This will bring the side rails nearer to each other or farther apart, and, consequently, regulate the width of the furrows. To provide strong and secure joints in this transverse adjustment of the frame, the front and rear cross-bars have their respective extremities formed with elongated tenons $c$ and $d$, which have longitudinal movement within through-mortises $a$ and $b$ made in the two side rails. Each of these tenons is provided with two or more bolt-holes in longitudinal line, with which the bolts which pass through the side rails interchangeably engage. The scraper-shaft is loosely journaled in suitable bearings formed within the rear extremities of the side rails, and adapted to be rotated by the foot-lever, secured thereto.

The extremities of the scraper-shaft are formed, respectively, with longitudinal slots $a'$, in which the shanks $b^1$ of the scrapers are adjusted, the extremities of said shanks being screw-threaded and provided with nuts $b^2$, whereby the scrapers are clamped in position. Hence the scraper-shaft need not, in the transverse adjustment of the frame, be removed, since it is provided with scrapers which may be located at any desired point, and which will be maintained in proper position over the wheels whatever be the width of the frame. This lateral adjustment may be easily and quickly made without disturbing any of the operating parts of the machine.

The driver's seat F' is supported upon the rear cross-bar, and also upon the bar D'. In turning the implement the driver throws his weight upon the rear of the seat, and thus relieves the front wheel of pressure, and enables the device to be turned easily upon the two rear wheels.

Having fully described my invention, what I claim as new, and desire to secure by Letters Patent, is—

In a corn-planter, the combination, with pivoted feed-plates S, which have movement in a horizontal plane, together with springs Z, whose free extremities have lateral bearing against the inner side edges of said plates and tend to maintain the latter in closed position, of a trip-lever, W, centrally pivoted to the side frame, and having vibrating movement in a vertical plane, together with intermediate connection X, said trip-lever being adapted to be actuated in a single direction by engagement therewith of a wiper, $y$, secured to the side wheel in radial adjustment, substantially as set forth.

MICHEL MARTISCHANG.

In presence of—
  H. G. STEMPEL,
  R. J. SMITH.